United States Patent
Harjula et al.

(10) Patent No.: US 10,187,213 B2
(45) Date of Patent: Jan. 22, 2019

(54) OFF DEVICE STORAGE OF CRYPTOGRAPHIC KEY MATERIAL

(71) Applicant: Venafi, Inc., Salt Lake City, UT (US)

(72) Inventors: Tero Petteri Harjula, Espoo (FI); Breon Malachy McCartney, Helsinki (FI)

(73) Assignee: Venafi, Inc., Salt Lake City, UT (US)

( * ) Notice: Subject to any disclaimer, the term of this patent is extended or adjusted under 35 U.S.C. 154(b) by 327 days.

(21) Appl. No.: 14/535,558

(22) Filed: Nov. 7, 2014

(65) Prior Publication Data
US 2016/0134423 A1 May 12, 2016

(51) Int. Cl.
*H04L 9/32* (2006.01)
*H04L 9/14* (2006.01)
*H04L 29/06* (2006.01)

(52) U.S. Cl.
CPC ........... *H04L 9/3247* (2013.01); *H04L 9/14* (2013.01); *H04L 63/061* (2013.01); *H04L 63/08* (2013.01); *H04L 2209/24* (2013.01); *H04L 2209/72* (2013.01)

(58) Field of Classification Search
CPC ..... H04L 9/3247; H04L 63/0428; H04L 9/14; H04L 2209/72; H04L 2209/24; H04L 63/08; H04L 63/061
See application file for complete search history.

(56) References Cited

U.S. PATENT DOCUMENTS

| | | | | |
|---|---|---|---|---|
| 6,834,112 B1* | 12/2004 | Brickell | ............... | G06F 21/31 380/279 |
| 8,290,165 B2* | 10/2012 | Allen | ............... | H04L 9/0825 380/277 |
| 8,417,667 B1* | 4/2013 | Lefevre | ............... | G06F 17/30144 707/609 |
| 8,966,267 B1* | 2/2015 | Pahl | ............... | H04L 9/0844 380/273 |
| 2003/0093678 A1* | 5/2003 | Bowe | ............... | H04L 9/3236 713/180 |
| 2006/0190723 A1 | 8/2006 | Benson | | |
| 2006/0248082 A1* | 11/2006 | Raikar | ............... | H04L 9/32 |

(Continued)

FOREIGN PATENT DOCUMENTS

WO WO-2016118217 A2 7/2016
WO WO-2016118217 A9 7/2016

OTHER PUBLICATIONS

SSH.com"SSH Agent, How to Configure Forwarding Protocol.", https://www.ssh.com/ssh/agent, Aug. 3, 2017, pp. 1-4.*

(Continued)

*Primary Examiner* — Robert B Leung
*Assistant Examiner* — Thomas Ho
(74) *Attorney, Agent, or Firm* — Schwegman Lundberg & Woessner, P.A.

(57) ABSTRACT

In representative embodiments keys used in authentication are removed from local systems and stored on a key server system. When keys are needed for authentication, requests are routed to the key server system. In some embodiments, the keys do not leave the key server system and the key server system performs requested operations using the keys. In other embodiments, secure protocols are used to temporarily allow the local system to retrieve and use the key. In this latter situation, keys are not maintained on the local system.

16 Claims, 8 Drawing Sheets

(56) References Cited

U.S. PATENT DOCUMENTS

| | | |
|---|---|---|
| 2009/0034735 A1 | 2/2009 | Jerdonek |
| 2012/0170750 A1 | 7/2012 | Orsini et al. |
| 2013/0117554 A1 | 5/2013 | Ylonen |
| 2013/0191631 A1* | 7/2013 | Ylonen ............... H04L 63/1483 713/153 |
| 2015/0271144 A1 | 9/2015 | Ronca |

OTHER PUBLICATIONS

Cyberark "Privileged Account Security Release Notes Version 9.9" 1999-2017, pp. 1-27.*

RedHat, "Managing Public SSH Keys for Users", https://access.redhat.com/documentation/en-us/red_hat_enterprise_linux/6/html/identity_management_guide/user-keys, 2018.*

SSH-Agent, http://man.openbsd.org/OpenBSD-current/man1/ssh-agent.1, Nov. 30, 2016, pp. 1-3.*

"International Apglication Serial No. PCT/US2015/059634, International Search Report dated Jul. 21, 2016", 4 pgs.

"International Application Serial No. PCT/US2015/059634, Written Opinion dated Jul. 21, 2016", 7 pgs.

* cited by examiner

OFF DEVICE STORAGE OF CRYPTOGRAPHIC KEY MATERIAL

FIELD

This application relates generally to managing keys used to authenticate one entity to another and, in an example embodiment, a system that uses a private key, a system that uses a public key or a system that uses both a private key and a public key stored on a centralized key server to authenticate the system to a third party system.

BACKGROUND

Secure Shell (SSH) is a protocol that leverages public key cryptography to authenticate and secure access among computers in a computer network. SSH secures, among other things, Telnet-related operations. Telnet has traditionally been used for remote management of various systems such as Unix, Linux, and Unix-like computers, routers, switches, firewalls, and other appliances and systems running a variety of operating systems. It has also been used for automated connections between systems via scripting and batch processing. SSH secures Telnet connections by authenticating servers to which a user or system is connecting (ensuring they are not connecting to the wrong server), encrypting the connection to the server (so private data is not publicly viewable), and optionally authenticating the client using public key cryptography as an alternative to usernames and passwords.

File transfer protocol (FTP) has commonly been used along with Telnet to facilitate management and operation of such systems and is subject to the same security challenges. Consequently, protocols such as Secure FTP (SFTP) and Secure Copy (SCP) have been developed to be used alongside SSH and generally use the same public and private keys (Key Pairs) used for SSH for their security. References within this document to SSH also refer to SFTP and SCP.

SSH devices and systems may include SSH clients, SSH servers, and SSH-enabled computing appliances, entities, or virtual machines acting as SSH clients or SSH servers. Separate user accounts may also act as SSH devices.

DETAILED DESCRIPTION

Figure 1:
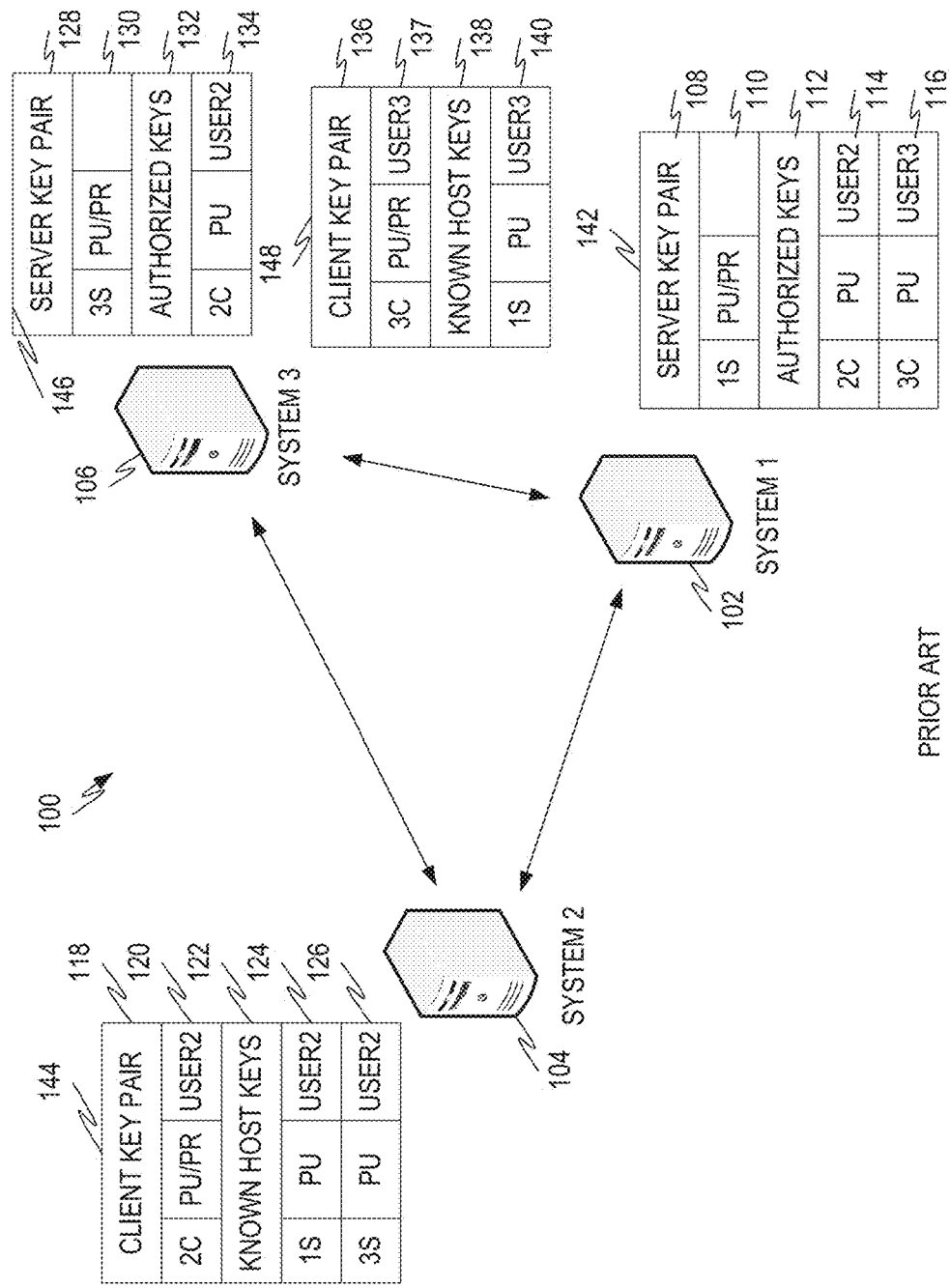
FIG. 1 illustrates a basic prior art system storing and using keys for authentication.

In the following description, for purposes of explanation, numerous specific details are set forth to provide a thorough understanding of example embodiments. It will be evident to one skilled in the art, however, that the present subject matter may be practiced without these specific details.

Overview

This disclosure describes systems and methods for authentication that do not store the private key used for authentication on the system where the entity is that is being authenticated. In a simple example, a first entity (e.g., a server) wants to authenticate a second entity (e.g., user, account, machine and/or so forth). The authentication protocol uses the second entity's private key to prove the identity of the second entity. Contrary to existing practice the private key is not stored with the entity, but rather on a central key server. The authentication takes place with the central key server providing the cryptographic evidence for the authentication protocol. In this disclosure, SSH will be used as a representative example of an authentication protocol. However, the systems and methods are equally applicable to any protocol that uses public/private key pairs for authentication (or other purposes).

In the SSH protocol a client (i.e., the system or user that initiates the connection) connects to a server (i.e., the system to which a connection is requested and made). A client may include a person (e.g., a user) and/or a service/machine account at the client system. In the simplest configuration, a key pair comprising a public key and a private key may be generated for an SSH server. The public key may be used by one or more SSH clients to authenticate the SSH server (e.g., the server may use its private key to encrypt, or sign, something which the public key may decrypt, or verify a signature, thus indicating to the SSH client the identity of the SSH server). The SSH clients may store the public key after the first connection with the SSH server, creating a trusted relationship between the SSH client and the SSH server. The stored SSH server public key may be referred to as a "known host key." Optionally, a key pair can be generated for a client to authenticate the client to SSH servers using public key cryptography instead of usernames and passwords. The SSH servers to which the client connects may store its public key, creating a trusted relationship between the SSH server and client in which the stored key may be referred to as an "authorized key."

Because administrators who manage the systems that act as SSH servers and clients may individually generate key pairs and distribute or store the public keys used for authentication, these key pairs and public keys have proliferated broadly in organizations. This phenomenon has effectively created untracked trusted relationships and access between systems (and users). The private keys remain on the devices where there are used (e.g., the client and/or server). In fact, it is a tenant of good security that the private keys should be generated where they are to be used and should not leave the device where they are generated.

One of the biggest risks with the standard approach to generating and storing private keys is the risk of lost or stolen private keys. In the SSH context, the private keys by their very nature do not expire and thus a stolen copy of a private key may yield access to a server (or other entity) for an unlimited time. SSH private keys have thus become the target of malware, Trojans and other malicious acts in an effort to obtain copies of SSH private keys.

The systems and method described herein provide for SSH authentication with the keys stored not on the device, but in an external, secure device outside of the SSH authenticating and connecting devices. This means that the private key required to establish user authentication is not accessible to the user itself and in some embodiments may not be visible to the network. The systems and methods thus make it more difficult to steal private keys, allow for extended user authentication monitoring, offers controls over when and from where a user can establish authentication and enables a central location to immediately revoke all user access based on such public/private key authentication schemes.

Definitions

In this disclosure, the following terms and definitions will be used.

Client means the system, user, device, account, and so forth that initiates a secure connection, such as when a secure connection request is sent. A system, device, virtual machine, groups thereof, and so forth may have multiple clients.

Server means the system, host, device, account, and so forth that receives a secure connection request (e.g., from a client). A system, device, virtual machine, groups thereof, and so forth may have multiple servers.

Client/Server means a system, device, virtual machine, groups thereof and so forth that function both as a client and a server (e.g., has at least one client and at least one server).

Entity is a term that encompasses at least system, device, virtual machine, client, server, user, account, and so forth that can utilize or are associated with cryptographic key material as part of authenticated communications.

Cryptographic key material, or more simply key material, means a key, key pair, key instance, and so forth that is used in authenticated communications.

Cryptographic evidence means what is generated through use of a key for authenticated communications. As an example, if the authentication protocol calls for some material to be signed by an entities' private key, the resultant signature and/or signed material would be cryptographic evidence. In other words, cryptographic evidence is the output (or part of the output) of a function utilizing a key, key pair, key instance and so forth.

Key pair (KP) means a public/private key combination where the private key may decrypt information encrypted by the public key or where a public key verifies signatures created by the private key.

Key set (KS) means all instances of a particular key pair. The key set may be a client key set or a server key set.

Key instance (KI) means a single instance of a particular key or key set. The key instance may be a client key instance, a server key instance or a key set instance. Key instance may be part of a key set, or a singular occurrence of a public or private key.

Key options mean one or more options provided by a particular implementation (e.g. SSH or other implementation) such as forced commands, source restrictions (e.g., allow and/or deny access based on source such as the address, name, distinguished name, or other identifier of a system or other location from which or to which connection may be made), location control (including geographic, business, current, and so forth), and other options that may apply to limit or grant use of the trust relationship (e.g. no X11 forwarding, no agent forwarding, no port forwarding, etc.) and so forth.

Key properties, also referred to as key characteristics, mean one or more characteristics of a key, key pair, key set, key instance, etc. such as key length, the algorithm used to generate the key and so forth. Key characteristics also includes properties about the key such as contact information of a person responsible for or related to the key, authorized storage location(s) for the key, and so forth.

Client Trust (CT) means a trust relationship where it is established that a client private key is linked to the authorized public key on a server. This is often evidenced by way of having the client public key stored in server side authorized key file.

Server Trust (ST) means a trust relationship where it is established that the server public key is known by the client. This is often evidenced by way of having the server public key stored in client side user known host key file and/or global known host key file.

Trust relationship means CT and/or ST. A trust relationship exists where CT and/or ST exist between a client and server.

DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

FIG. 1 illustrates a basic representative network 100 using SSH for authentication and security. In this network 100, systems store keys on server and client systems. Network 100 comprises system 102, which acts as a server. System 102 has block 142, which depicts all the keys stored and used on system 102. The keys illustrated in block 142 indicate that system 102 may operate as a server since it stores a server key pair 108. The server key pair 108 is a public/private key pair labeled 1S (meaning Sever 1). This is illustrated in FIG. 1 as server key pair 110.

In addition to its server key pair 110, system 102 knows several authorized keys, which may be stored in its authorized key file 112. These public keys are labeled 2C and 3C (meaning Client 2 and Client 3) and are associated with User2 and User3, respectively. Public key 2C is illustrated as 114 and public key 3C is illustrated as 116. Public key 114 indicates UT exists between Server 1 and Client 2 while public key 116 indicate UT exists between Server 1 and Client 3.

System 104 of FIG. 1 may operate as a client as indicated by the keys stored on system 104. The keys stored on system 104 are illustrated by block 144. System 104 has a client key pair 118. The client key pair 118 is labeled 2C (meaning Client 2) and comprises a public/private key pair associated with User2. This is illustrated in FIG. 1 as client key pair 120. As previously indicated, the public portion of key pair 120 is stored on system 102 as public key 114.

System 104 also knows several server public keys, which may be stored in known host key file 122. These public keys include server public key 1S (meaning Server 1) and server public key 3S (meaning Server 3), illustrated as public key 124 and public key 126, respectively. Public key 124 indicates HT exists between Client 2 and Server 1 and public key 126 indicates HT exists between Client 2 and Server 3.

System 106 may include both a server and a client as indicated by key block 146 and key block 148, respectively. Server key pair 128 includes the key pair for Server 3, as indicated by key pair 130. Sever 3 also knows the public key for Client 2 (associated with User2) as indicated by public key 134. Public key 134 may be stored in Server 3's authorized key file 132 as indicated. Public key 134 indicates UT exists between Server 3 and Client 2.

Key block 148 indicates system 106 may operate as Client 3 as indicated by client key pair 137. Client key pair 137 is associated with User3. Client 3 also knows about Server 1 as indicated by public key 140, which may be stored in known host key file 138. Public key 140 indicates HT exists between Client 3 and Server 1.

FIG. 1 is a simple example with a few servers and clients interacting. However, it serves the purpose of representing how keys and trust relationships may exist between systems. The systems of FIG. 1 may be physical, virtual, or some combination thereof. For example, on system 106, Server 3 may execute within one virtual machine and Client 3 may execute within a different virtual machine. Alternatively, both may execute on the same physical or virtual machine. In general, systems (physical or virtual) may operate as a server, as a client, or as both a server and a client at different times. As the number of servers and clients grows, the number of trust relationships and keys grow significantly, and the addition of a few more systems can significantly increase the complexity of managing keys. A typical installation may have hundreds, thousands, tens of thousands, or more such keys and/or relationships.

Figure 2:
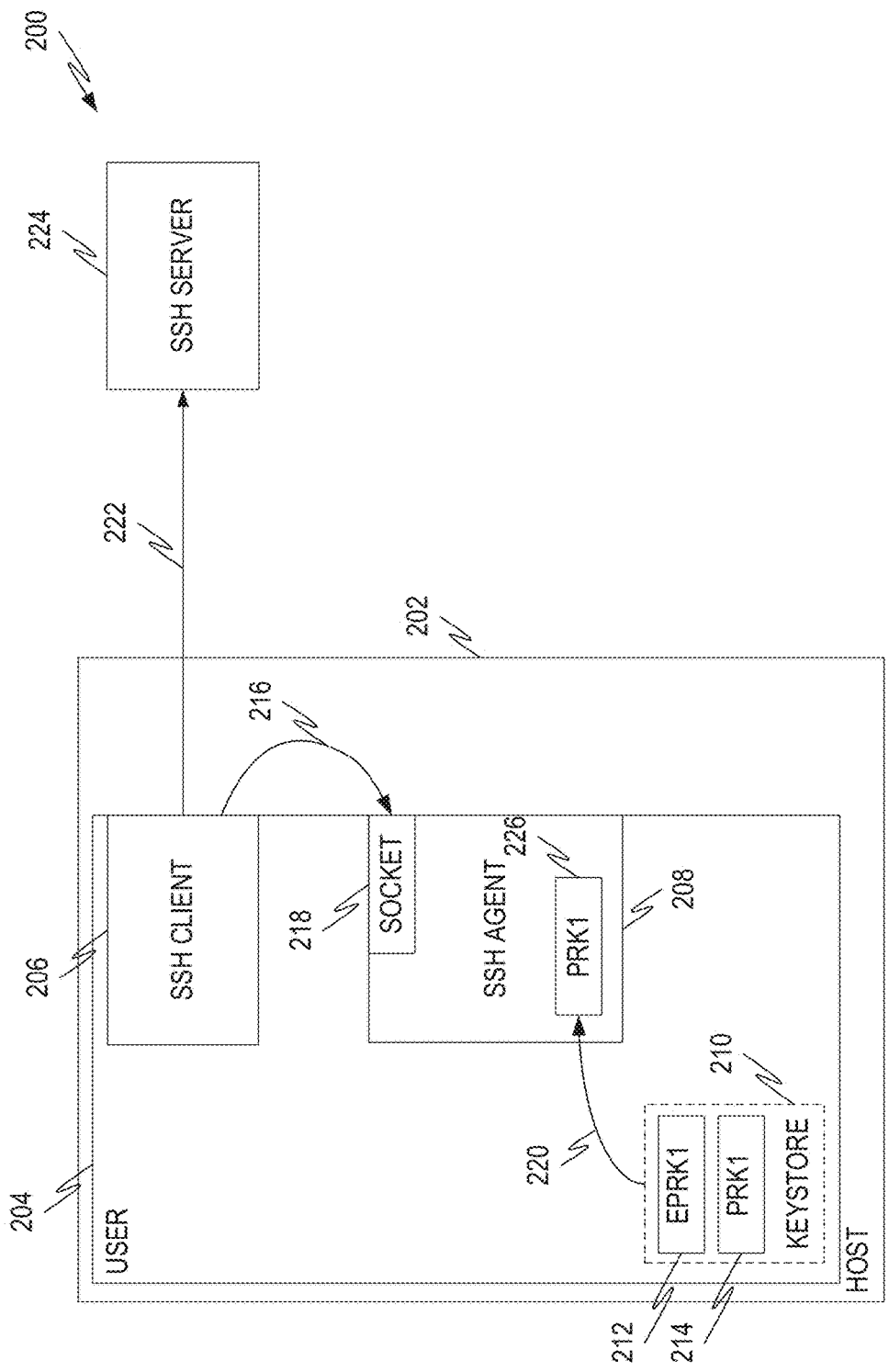
FIG. 2 illustrates a representative prior art embodiment showing how keys are used to authenticate an SSH client to an SSH server.

FIG. 2 illustrates a representative prior art embodiment 200 showing how keys are used to authenticate an SSH client to an SSH server. Differences exist between version 1 and version 2 of the SSH protocol, but both have the notion of using a private key to prove identity. The following focuses on the client proving its identity to the server, although authentication for the server proving its identity to the client works similarly. In SSH version 1, the server encrypts a message with a public key stored in the authorized key file (e.g., the client's public key), the client to decrypts it (using its private key) and return its checksum (modified by a session ID). In SSH version 2, the client signs a message (depending on the session ID) and transmits the signature without the message but with the public key used. The server then recreates the message and verifies the signature using the client's public key stored in its authorized key file.

Public and/or private keys are utilized by an SSH agent to prevent a user from having to type in a long key each time it is used. Thus, an SSH agent is a program that keeps/uses a copy of the keys for SSH programs to use. Often a user has to type a passphrase for the key when it is needed.

Turning now to FIG. 2, the architecture 200 comprises an SSH server 224 which the user 204 will authenticate its identity to. The architecture shows that the user 204 resides on a host machine 202. In this example, the user 204 represents the entity proving its identity and is not a human, although it may be associated with a human.

The user 204 utilizes an SSH client 206 as part of the authentication protocol. As part of the authentication protocol, the SSH client 206 will need the output of a function using the private key of user 1 (e.g., cryptographic evidence). As explained above, the cryptographic evidence may be decrypting a message using the private key and generating the decrypted message checksum or the cryptographic evidence may be a signature created using the private key or may be some other cryptographic evidence. In these examples, any or all of these can be considered to be the cryptographic evidence (e.g., the decrypted message, the checksum created from the decrypted message, the signature and/or a signed message) since all are produced either directly or indirectly using the private key (e.g., are the output of a function using the private key).

In the example of FIG. 2, when the SSH client 206 wishes to use the private key, the SSH client makes a request to the SSH agent 208. The request can be sent in a variety of ways, such as an API call, a message, and so forth. In the representative example, the request 216 is sent to a socket 218 provided by the SSH agent 208. The SSH agent retrieves the desired private key, PrK1 226, and either returns the key or uses the key to provide cryptographic evidence, depending on the implementation.

Private keys are typically stored in a key store 210 and the SSH agent 208 retrieves the key from the key store 210. In many embodiments, the SSH agent 208 does not retrieve the keys automatically. In these embodiments, the user must perform some action to add the key to the memory of the running process. If the SSH agent 208 does not provide an appropriate key, the SSH client 206 can access the keystore 210 directly. The keys in the key store can be encrypted, as illustrated by the encrypted version of PrK1, ePrK1 212, or unencrypted as indicated by the unencrypted version of PrK1 214.

The SSH client 206 then returns the desired cryptographic evidence as indicated by arrow 222.

The architecture of FIG. 2 is subject to several types of attacks and shortcomings. As representative examples only:

Unattended use of the agent. An unattended machine may allow someone to utilize the SSH agent for a variety of purposes. Typical recommendations to combat this type of misuse is to remove the key from the agent when the machine is going to be unattended and/or locking the machine.

Tricking the agent. If someone else on the computer can act as the user (e.g., root can do this), they can give data to the agent and have it processed as if you asked. Typical recommendations to combat this type of misuse is to not run an agent on a computer where the admin is untrusted. However, even where an admin is trusted, misuse can still occur through bad acts, rogue processes, etc.

Stealing the key. Someone with access to the computer's memory (e.g., root or a process with root privileges) can search through the agent's data and get an unencrypted copy of the key. Typical recommendations to combat this type of misuse is to not run an agent on a computer where the admin is untrusted. However, even where an admin is trusted, misuse can still occur through bad acts, rogue processes, etc.

Figure 3:
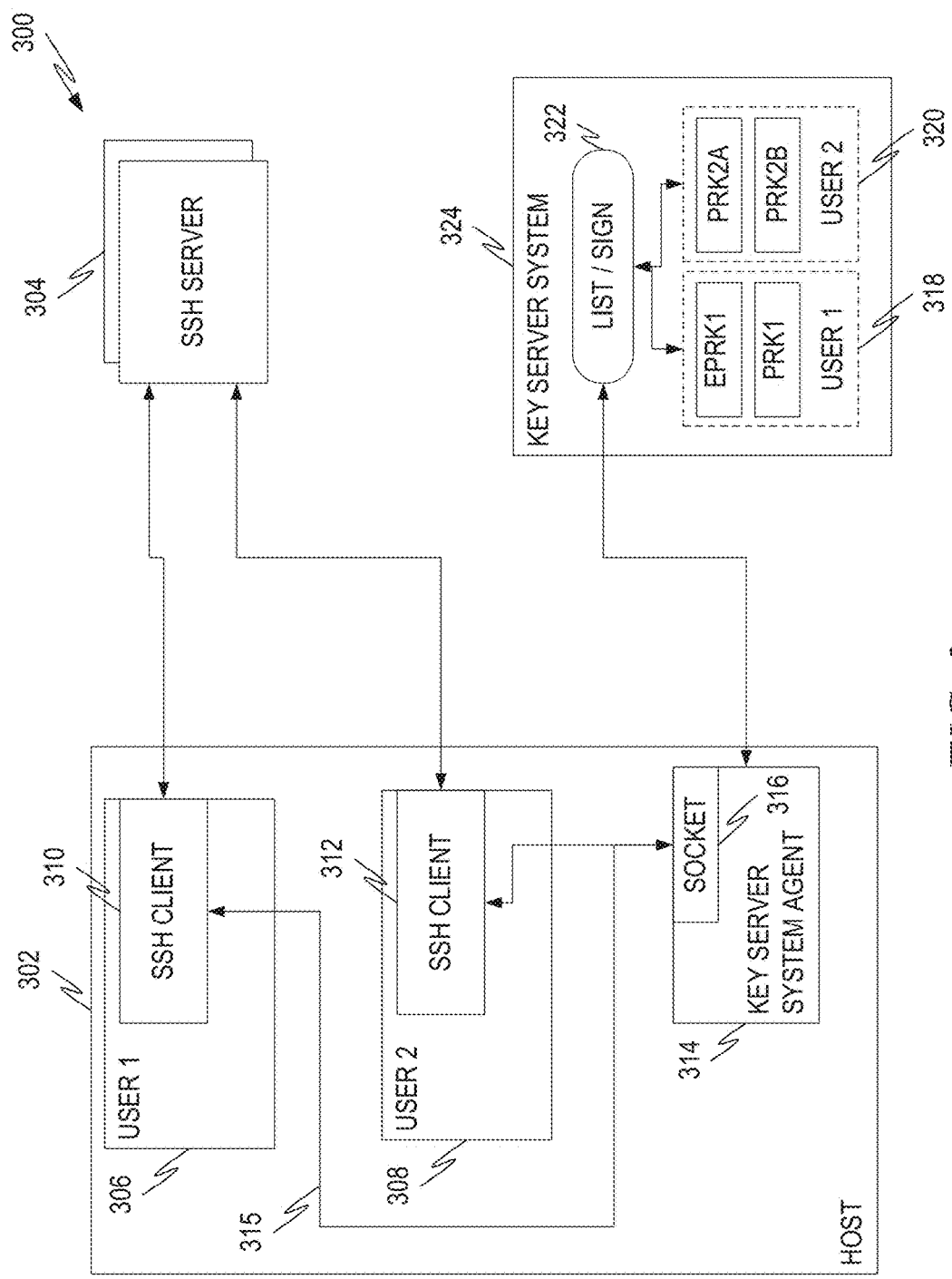
FIG. 3 illustrates representative system to use a key not stored on the system to authenticate to an SSH server.

FIG. 3 illustrates representative system 300 to use a key not stored on the system to authenticate to an SSH server. Although SSH is used as an example, the same architecture also applies to other authentication methods using a private key. Similarly, although the particular example is an SSH client authenticating to an SSH server, the architecture also applies to an SSH server authenticating to an SSH client, where the SSH server would utilize a key stored on a central key system (e.g., 324).

In the representative example, the SSH server requests proof of identity. The client provides that proof using cryptographic evidence, such as using a private key to produce a signature or producing a checksum (or other hash value) across a message/document decrypted using the private key. In the embodiment of FIG. 3, a host system 302 has two user/client accounts. User 1 306 and user 2 308. Each user account may have its own SSH client, 310 and 312, or share access to the same SSH client or a SSH client service within the Host 302. Key Server System Agent has established new environment variable(s) for the Host. The SSH clients establish authentication communications utilizing e.g. SSH_AUTH_SOCK 315 request from a common Key Server System Agent 314, instead of an SSH Agent such as that illustrated in FIG. 2, to have the cryptographic evidence produced by a key server system 324. In this manner, only a single agent is needed. However, in alternative embodiments, each user can utilize its own Key Server System agent. In that embodiment, each Key Server System Agent would communicate with key server system 324 as described below.

The key server system 324 provides the functionality to produce the cryptographic evidence as represented by list/sign functionality 322. For example, the key server system can be presented with a request to create a signature across a particular message, document, and so forth. Since the server has access to the appropriate keys, the server can produce the evidence as requested. For example, as illustrated in the representative embodiment of FIG. 3, the key server system 324 stores the private keys of user 1 in key store 318 and stores the private keys of user 2 in key store 320. As previously indicated, the keys can be stored either encrypted (e.g., as illustrated by ePrK1) or non-encrypted (as indicated by PrK1, PrK2a and PrK2b).

If user 1 desired cryptographic evidence to be produced, key server system 324 would identify the correct key, retrieve the key from the key store 318, produce the evidence as requested, and return the evidence.

Functions implemented by key server system 324 can include any functions to produce cryptographic evidence. Additionally, or alternatively, key server system 324 can implement other types of functions such as listing keys and/or the respective allowed authentication accesses for a particular user from the selected client to allowed hosts, access- and time controls, access limits and possible other controls and limitations, key usage logging information and/or so forth. In some embodiments, key information is not displayed to reduce the likelihood of key copying. However, the functionality implemented and provided to users would not allow one user unauthorized access to another user's keys, or other functionality that presented a security risk that violated policies of the key server system 324.

Implicit in this last statement is that some embodiments of the key server system 324 include policies that allow appropriate use of the stored keys while precluding behavior considered too risky. What behavior is considered too risky can vary from policy to policy, depending on tolerance for risk, needs of the business and so forth. For example, in some embodiments, the keys are not sent to the user (e.g., the Key Server System Agent 316, etc.), as that would place them at risk for theft. However, in other embodiments, keys could be provided to the user under appropriate circumstances. Additionally, or alternatively, the key server system can implement policies for key options, key properties, key rotation, key revocation, key issuance, and/or other such policies. Since the keys are stored centrally, they can be effectively managed to minimize security risks in accordance with a desired security profile.

Figure 4:
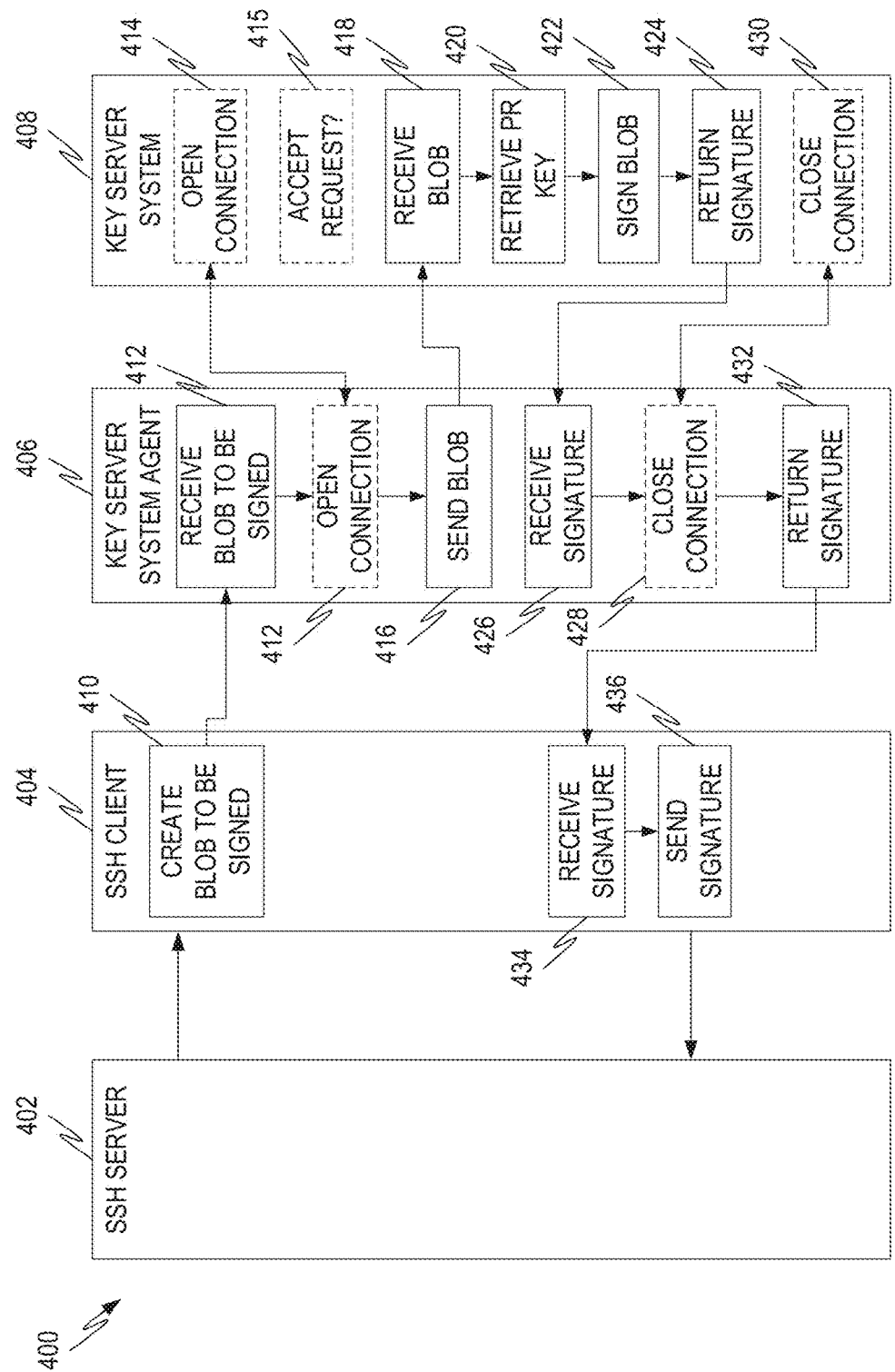
FIG. 4 illustrates a representative flow diagram between an SSH server, an SSH client, an SSH agent and a key server system in a representative embodiment.

FIG. 4 illustrates a representative flow diagram 400 between an SSH server 402, an SSH client 404, a Key Server System Agent 406 and a key server system 408 in a representative embodiment. This flow diagram is representative, for example, of how a system such as that illustrated in FIG. 3 can operate. Thus, the SSH client 404 can be a representative embodiment of the SSH client 310 and/or the SSH client 312. The Key Server System Agent 406 can be a representative embodiment of the Key Server System Agent 314. The key server system 408 can be a representative embodiment of the key server system 324.

The SSH client 404 desires cryptographic evidence to prove identity such as the identity of the user account to the SSH server 402. The SSH client 404 creates a request that includes the information needed to create the cryptographic evidence. In a representative embodiment the information needed to create the cryptographic evidence can comprise at least one of:

1. an identifier to identify the key to be used to create the cryptographic evidence;
2. the type of cryptographic evidence to be created (e.g., a signature, hash value, check sum and/or other evidence);
3. a mechanism to identify the method used to create the cryptographic evidence (if, for example, it is not clear from other information); and/or
4. the "input" to the method used to create the cryptographic evidence, such as a message, document, or so forth across which a signature or checksum is to be created.

In the representative embodiment of FIG. 4, the cryptographic evidence is a signature across a designated message, document and/or so forth. In this example, the message, document, etc. will be referred to by the generic term "blob" meaning a block of information across which the signature is to be generated. In operation 410, the SSH client 404 creates the blob to be signed, creates the request including any other desired information and forwards the request to the Key Server System Agent 406 by any number of different mechanisms such as an API call, a message, Public Key Cryptography standard (PKCS) #11, or other mechanisms.

In the illustrated embodiment, the SSH agent 406 receives the request, including the blob to be signed in operation 412. The Key Server System Agent 406 can reformat the message, extract information needed by the key server system 408, create a different request using a different format and the extracted information and/or other operations that are not illustrated in FIG. 4, depending on the embodiment.

Once the information is formatted correctly for the key server system 408, the Key Server System Agent 406 opens a secure connection to key server system 408 in operations 412/414. The blob and/or other information is then sent to the key server system 408 in operations 416/418 and the connection is closed or left open, depending on the embodiment. In the illustrated embodiment, the connection remains open.

The key server system 408 receives the request, including the blob to be signed at operation 418. The key server system 408 identifies the correct key and retrieves the key in operation 420 and produces the cryptographic evidence in operation 422. In the illustrated example, the cryptographic evidence is a signature across the blob.

The key server system 408 implements policies in some embodiments to describe conditions, characteristics, and so forth under which the cryptographic evidence is given. For example, such policies can place limits or restrictions on when cryptographic evidence when such evidence can be provided. Thus, the key server system 408 may refuse to provide evidence (or conversely may provide evidence) based on one or more factors such as time (time of day, day of week, etc.), key properties, key options, system being authenticated to/from, and so forth. As a representative example, a particular user may be authorized to authenticate on the weekend from a particular location but not from other locations while a different user may not be authorized to authenticate after 6:00 pm any week day or anytime on any holiday or weekend.

The process of determining whether a request for cryptographic evidence will be accepted (honored) is illustrated in FIG. 4 as operation 415, which may be performed at any point in the operations prior to actually returning the cryptographic evidence. In one representative example, the key server system 408 will not accept a connection unless certain conditions are met. In another example, the system accepts the connection and then examines the information passed to it to determine whether the request for cryptographic evidence will be accepted.

If the key server system 408 accepts the request to provide cryptographic evidence, once the cryptographic evidence is produced, the secure connection is reopened (not illustrated) if it was previously closed before. The cryptographic evidence (in this case the signature) is then returned to the Key Server System Agent 406 as illustrated in operation 424. The secure connection is then closed as indicated in operations 428/430.

The cryptographic evidence is returned to the SSH client 404 as indicated by operations 432/434. The SSH client 404 then sends the cryptographic evidence to the SSH server 402 in operation 436 to authenticate its identity to the SSH server 402.

Figure 5:
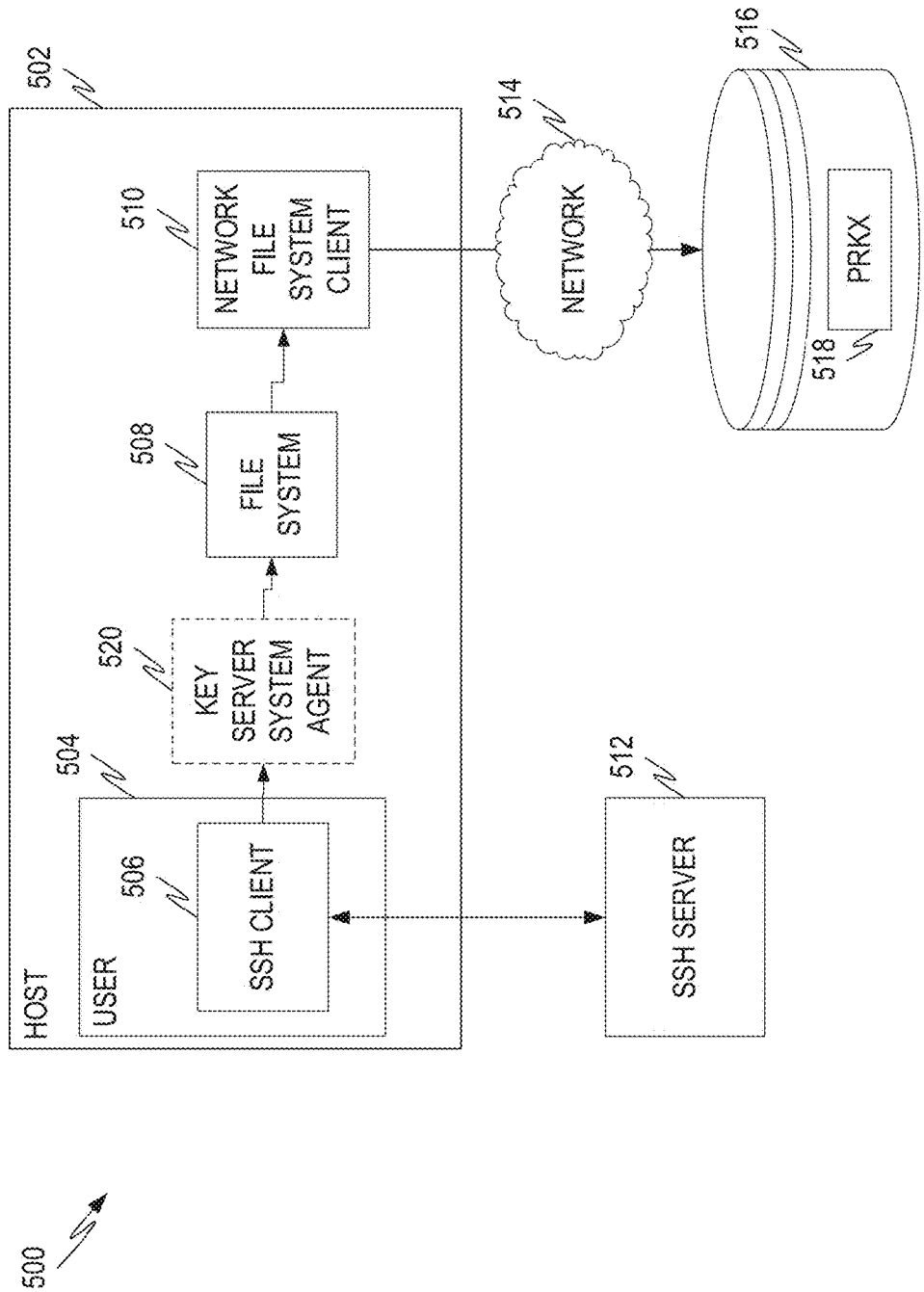
FIG. 5 illustrates another representative system to use a key not stored on the system to authenticate to an SSH server.

FIG. 5 illustrates another representative system 500 to use a key not stored on the system to authenticate to an SSH server. In this example, an extended file system, such as a Network File System (NFS) or other such file system. These file systems allow remote files to be accessed locally as if they were stored on a local disk or other data store. Although any type of file system that allows remote files to be accessed locally can be used, the examples herein use NFS as an illustrative example.

In the embodiment of FIG. 5, the private key PrKx is stored in a data store 516 remote from the host system 502. The data store can be protected from access except by designed entities and thus provide limits on who can access the private key(s). The host system 502 comprises one or more of the user account 504, an SSH client 506, a Key Server System Agent 520, a file system 508 and/or a network file system client 510. In some embodiments, the Key Server System Agent 520 is present, while in other embodiments, the Key Server System Agent 520 is not present and the SSH client 506 creates the cryptographic evidence directly.

The SSH client 506 desiring to authenticate to the SSH server 512 creates an appropriate request and forwards it to the Key Server System Agent 520 for handling. The Key Server System Agent 520 then accesses the appropriate private key PrKx 518 via the file system 508, network file system client 510 over the network 514. The private key PrKx 518 is used for authentication validation, and depending on the decision, result is returned to the Key Server System Agent 520 which produces the desired cryptographic evidence and returns it to the SSH client 506, which then uses it to authenticate to the SSH server 512. After creating the cryptographic evidence, the Key Server System Agent 520 deletes the signing results from memory so it does not reside on the host system 502.

The system 500 has the advantage that the key 518 is not stored locally but can be read as if it were stored locally. Furthermore, this is achieved without modification to the SSH client 506. However, to the extent that the protocols between the entities (e.g., Key Server System Agent 520, the file system 508, the network file system client 510 and/or the data store 516) are not secure, the signing process 518 is subject to interception and/or other compromises.

Figure 6:
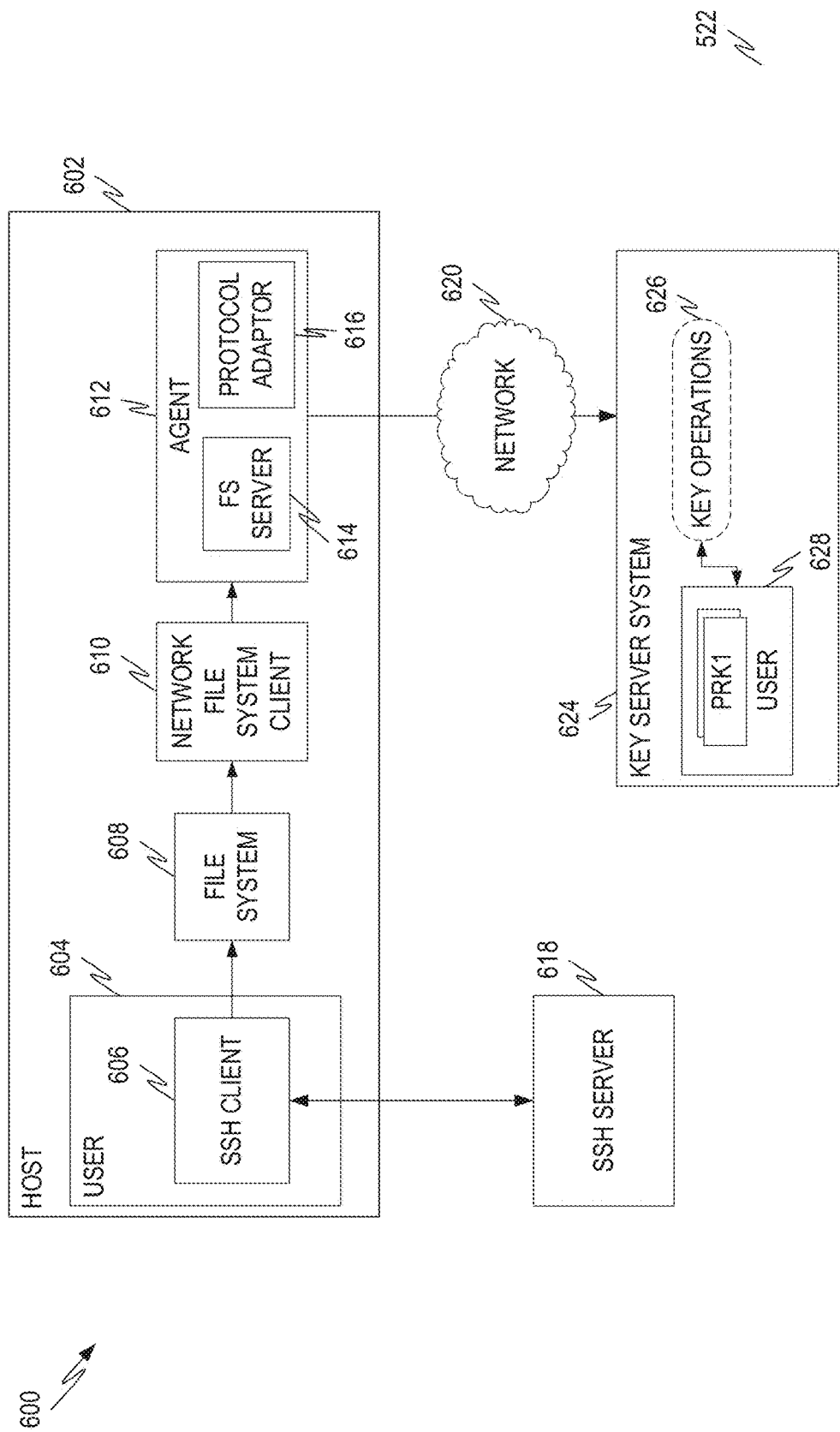
FIG. 6 illustrates another representative system to use a key not stored on the system to authenticate to an SSH server.

FIG. 6 illustrates another representative system 600 to use a key not stored on the system to authenticate to an SSH server 618. In this embodiment, the host system 602 includes one or more of a user account 604 with an SSH client 606, a file system 608, a network file system client 610, and/or a Key Server System agent 612. The SSH client 606 wishing to provide cryptographic evidence for authentication, can either be configured to produce the cryptographic evidence directly, or can be configured to request the cryptographic evidence from the key server system 624. In the former embodiment, the SSH client 606 retrieves the key, and in the latter embodiment, the SSH client 606 retrieves the cryptographic evidence.

The SSH client 606 retrieves the key or evidence through file system 608 and network file system client 610. In this embodiment, however, the request to retrieve the key/evidence is received by the Key Server System agent 612. The Key Server System agent 612 has an adaptor (e.g., file system server 614) that makes the agent look like a normal network file system to the network file system client 610. The Key Server System agent 612 also has an adaptor (e.g., the protocol adaptor 616) that allows the agent to talk to the key server system 624. Thus, the Key Server System agent 612 receives a request from the network file system client 610 and translates the request, the protocol and other such information into requests that the key server system 624 understands. The effect is that the exchanges between the Key Server System agent 612 and the key server system 624 can be more secure than a simple NFS request to a remote storage device. Additionally, or alternatively, the Key Server System agent can take advantage of functionality provided by the key server system 624. Finally, all the features and functionality described previously with regard to the key server system 324 and/or the key server system 408 can be available to the embodiment.

The dashed box around key operations 626 indicates that in some embodiments the key server system 624 returns the requested public or private key (e.g., a key stored in the user store 628). Alternatively, or additionally, the embodiment can be used to store and/or return anything that can be stored on a file system including configurations, policies, and so forth. In other embodiments, the key server system 624 can provide functions to produce cryptographic evidence.

Figure 7:
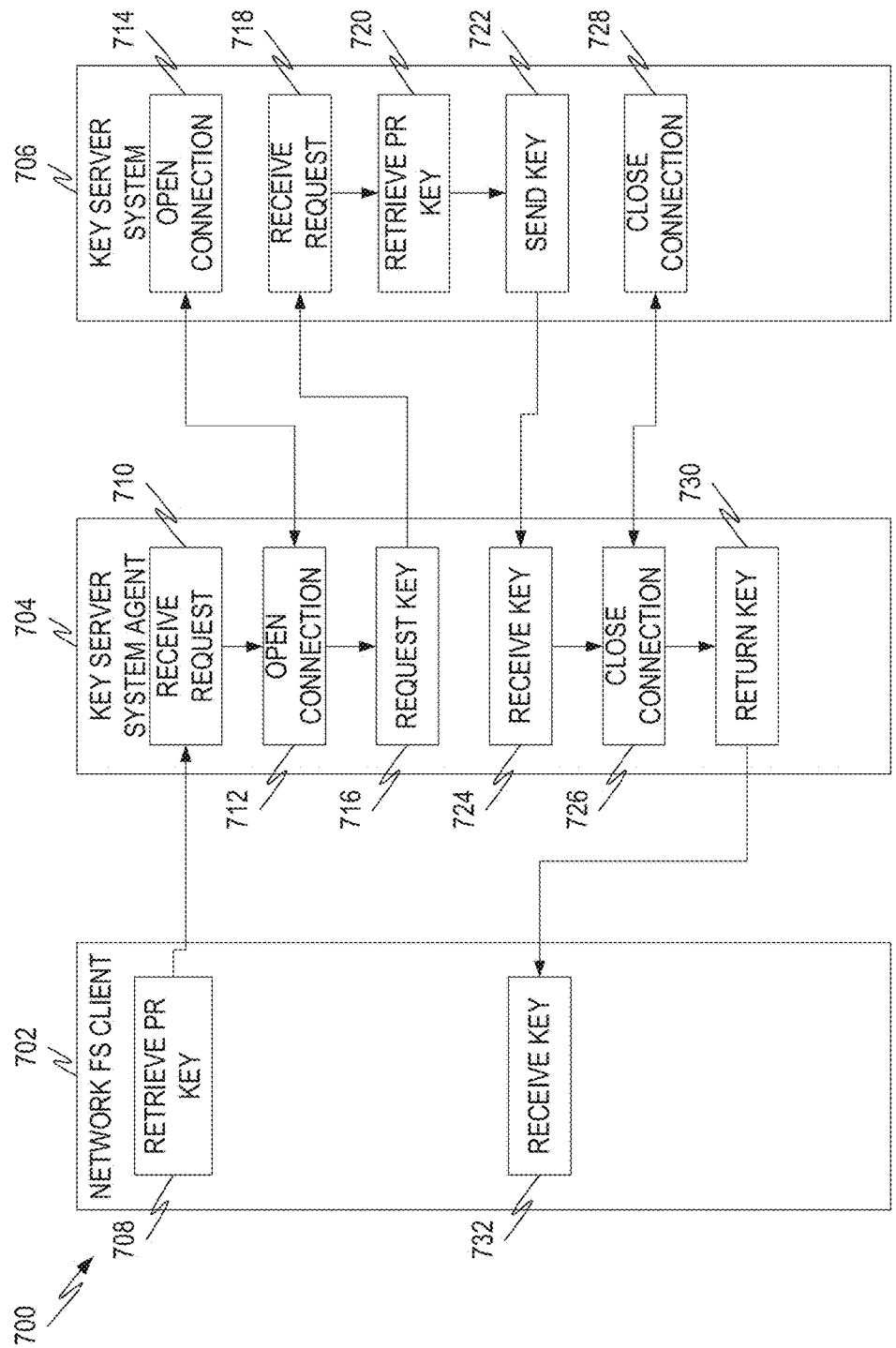
FIG. 7 illustrates a representative flow diagram between a network file system client, an agent and a key server system for a representative embodiment.

FIG. 7 illustrates a representative flow diagram 700 between a network file system client 702, a Key Server System agent 704 and a key server system 706 for a representative embodiment. The representative flow diagram can illustrate, for example, how the system in FIG. 6 operates. Thus the network file system client 702 can be a representative embodiment of network file system client 610, the Key Server System agent 704 can be a representative embodiment of Key Server System agent 612 and the key server system 706 can represent key server system 624. In the illustrated embodiment of FIG. 7, the key is retrieved and returned. However, in alternative embodiments, the key can remain on key server system 706 and key server system 706 can produce cryptographic evidence.

In operation 708, the network file system client 702 generates a request (e.g., in response to receiving a request from the file system) to retrieve the public key, private key and/or other information. The request is sent via the standard NFS protocol to the Key Server System agent 704, which receives the request in operation 710. The Key Server System agent 704, in turn, initiates retrieval of the desired key from the key server system 706. In the illustrated embodiment, a secure connection is opened to the key server system 706 in operations 712 and 714. The request to retrieve the key is sent/received in operations 716 and 718. The requested key is retrieved in operation 720 and returned in operations 722 and 724. At this point the connection can generally be closed as indicated by operations 726 and 728.

The agent then returns the key in operation 730 using the network file system protocol to the network file system client 702 in operation 732.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein are at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS), "infrastructure as a service" (IaaS), "platform as a service" (PaaS) or other such environments. For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures may be employed. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
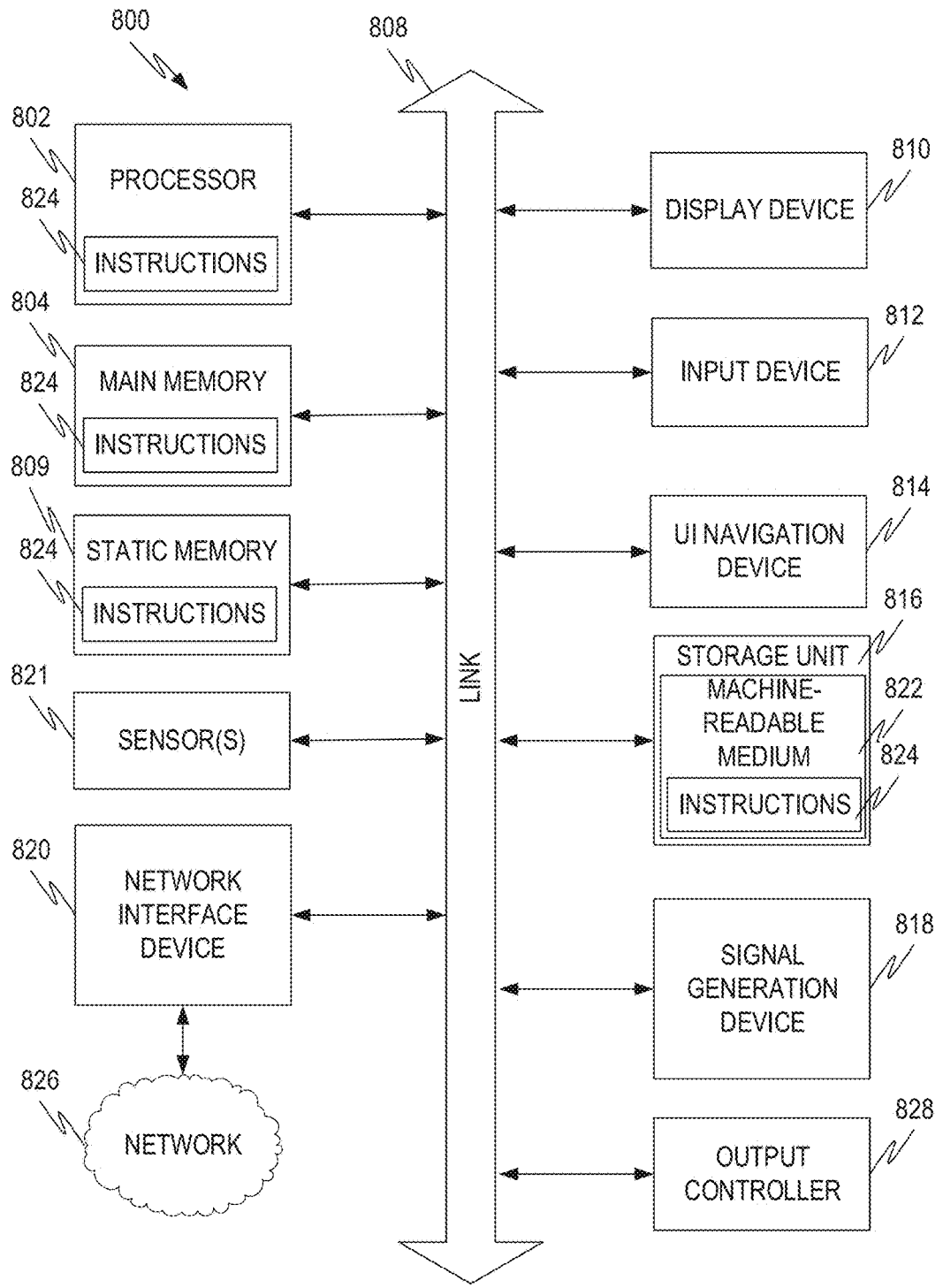
FIG. 8 is a block diagram of a machine in the example form of a processing system within which may be executed a set of instructions for causing the machine to perform any one or more of the methodologies discussed herein including the functions, systems and flow diagrams of FIGS. 1-7.

FIG. 8 is a block diagram of a machine in the example form of a processing system within which may be executed a set of instructions for causing the machine to perform any one or more of the methodologies discussed herein including the functions, systems and flow diagrams of FIGS. 1-7. In other words, the machine illustrated in FIG. 8 can be used for the host systems, SSH servers, key server systems, and so forth illustrated in FIGS. 1-7. In addition, the SSH clients, SSH agents, and functions of the SSH servers, key server systems, key server system agents, host systems, HSMs 'hardware security modules', and so forth can be implemented on a system such as that illustrated in FIG. 8.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a smart phone, a tablet, a wearable device (e.g., a smart watch or smart glasses), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that indi-vidually or jointly execute a set (or multiple sets) of instructions to perform any one or more of the methodologies discussed herein.

The example of the machine 800 includes at least one processor 802 (e.g., a central processing unit (CPU), a graphics processing unit (GPU), advanced processing unit (APU), or combinations thereof), a main memory 804 and static memory 806, which communicate with each other via bus 808. The machine 800 may further include graphics display unit 810 (e.g., a plasma display, a liquid crystal display (LCD), a cathode ray tube (CRT), and so forth). The machine 800 also includes an alphanumeric input device 812 (e.g., a keyboard, touch screen, and so forth), a user interface (UI) navigation device 814 (e.g., a mouse, trackball, touch device, and so forth), a storage unit 816 (including HSM), a signal generation device 828 (e.g., a speaker), sensor(s) 821 (e.g., global positioning sensor, accelerometer(s), microphone(s), camera(s), and so forth) and a network interface device 820.

Machine-Readable Medium

The storage unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804, the static memory 809, and/or within the processor 802 during execution thereof by the machine 800. The main memory 804, the static memory 809 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers, and/or HSMs) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The term machine-readable medium specifically excludes signals per se.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Transmission medium encompasses mechanisms by which the instructions 824 are transmitted, such as communication networks. Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method performed by a client machine having a Secure Shell (SSH) client and an SSH agent for use of cryptographic key material in authentication, the method comprising:
   receiving, by the SSH agent from the SSH client, a first request to use a private key associated with an account on the client machine to produce cryptographic evidence of identity of the account;
   responsive to receiving the first request, sending, by the SSH agent, a second request to a key server system storing the private key but not having the account thereon, the second request comprising a request to produce the cryptographic evidence of identify of the account using the stored private key;
   receiving, by the SSH agent, the cryptographic evidence from the key server system;
   returning, by the SSH agent, the cryptographic evidence to the client for use in an authentication protocol for the account.

2. The method of claim 1, wherein the cryptographic evidence produced by the key server system comprises material signed by the private key.

3. The method of claim 1 further comprising:
   receiving, by the SSH agent, from a second SSH client on the client machine, a third request to use a second private key associated with a second account on the client machine to produce second cryptographic evidence of identity of the second account;
   sending, by the SSH agent, a fourth request to a key server system storing the second private key but not having the second account thereon, to produce the second cryptographic evidence using the stored second private key;
   receiving, by the SSH agent, the second cryptographic evidence;
   returning, by the SSH agent, the second cryptographic evidence to the second SSH client for use in an authentication protocol for the second account.

4. A system for Secure Shell (SSH) authentication comprising:
   a processor;
   memory coupled to the processor;
   instructions stored in the memory that, when executed by the processor, convert the system into a particular machine comprising:
   at least one SSH client to authenticate at least one account located on the system to at least one SSH server;
   a Key Server System (KSS) agent, having no stored public or private keys, comprising:
      a first communication module to receive requests from, and return responses to the at least one SSH client:
         at least one of the requests from the at least one SSH client requesting use a cryptographic function and a private key to verify an identity associated with the at least one account, the private key being stored on a KSS separate from the system, the KSS not having the at least one account thereon; and
         at least one of the responses to the least one SSH client comprising output of the cryptographic function; and
      a second communication module to send requests to the KSS responsive to the first communication module receiving a request from the at least one SSH client, and receive responses from the KSS:
         at least one of the requests to the key server system comprising a request to access the private key stored on the key server system and execute the cryptographic function; and
         at least one of the responses from the key server system comprising the output of the cryptographic function.

5. The system of claim 4, wherein each account corresponds to either a user or a machine account.

6. The system of claim 5 wherein one or more of the at least one accounts corresponds to both a user and a machine account.

7. The system of claim 4 wherein the KSS agent module receives communications from a plurality of separate SSH client modules, each of which request execution of the cryptographic function with separate private keys in order to verify a different identity.

8. A method for use of cryptographic key material in authentication, the method comprising:
   receiving, from a secure shell (SSH) client on a client machine via a network file system client, a first request to retrieve cryptographic information associated with an account on the client machine, the cryptographic information comprising at least one of a private key, a public key, and a configuration;
   sending a second request to a key server system storing the cryptographic information but not having the account thereon, to request the key server system return the stored cryptographic information, the second request being sent using a different protocol than the protocol used by the network file system client;
receiving the cryptographic information from the key server system;
returning the cryptographic information to the SSH client for use in an authentication protocol initiated with an SSH server for the account.

9. The method of claim 8, wherein the first request is received using a network file system protocol.

10. The method of claim 8 further comprising:
receiving, from second SSH client via the network file system client, a third request to retrieve second cryptographic information associated with a second account, the second cryptographic information comprising at least one of a second public key, a second private key and a second configuration;
sending a fourth request to a key server system storing the second cryptographic information but not having the second account thereon using a different protocol than the protocol used by the network file system client, to retrieve the stored second cryptographic information;
receiving the second cryptographic information;
returning the second cryptographic information via the network file system client to the second SSH client for use in an authentication protocol initiated with a second SSH server for the second account.

11. A system for Secure Shell (SSH) authentication comprising:
a processor;
memory coupled to the processor;
instructions stored in the memory that, when executed by the processor, convert the system into a particular machine comprising:
a network file system client to communicate between at least one SSH client and a Key Server System (KSS) agent;
the at least one SSH client to authenticate at least one account located on the system to at least one SSH server;
the KSS agent comprising:
a first communication module to receive requests from, and return responses to the at least one SSH client via the network file system client:
at least one of the requests from the at least one SSH client requesting use of a cryptographic function and a private key to verify an identity associated with the at least one account, the private key being stored on a key server system separate from the system; and
at least one of the responses to the at least one SSH client comprising the output of the cryptographic function; and
a second communication module to send requests to, and receive responses from, the key server system using a protocol different from the network file system module:
at least one of the requests to the key server system comprising a request to access the private key stored on the key server system and execute the cryptographic function; and
at least one of the responses from the key server system comprising output of the cryptographic function.

12. The system of claim 11 wherein the KSS agent module receives communications from a plurality of separate SSH client modules, each of which request execution of the cryptographic function with separate private keys in order to verify a different identity.

13. A machine-readable storage medium having executable instructions encoded thereon, which, when executed by at least one processor of a machine, transform the machine into a particular machine performing particular operations comprising:
receiving, from a secure shell (SSH) client on the machine, a first request to use a private key associated with an account to produce cryptographic evidence of identity of the account;
responsive to receiving the first request, sending a second request to a key server system storing the private key but not having the account thereon, to request the key server system produce the cryptographic evidence using the stored private key;
receiving the cryptographic evidence from the key server system;
returning the cryptographic evidence to the SSH client for use in an authentication protocol for the account to authenticate the account to an SSH server.

14. The machine-readable storage medium of claim 13 wherein the first request is received via a network file system client and wherein the second request is sent using a protocol different than that used by the network file system client.

15. The machine-readable storage medium of claim 13 wherein the first request is received at a socket.

16. The method of claim 3 wherein the key server system storing the second private key is the same as the key server system storing the private key.

* * * * *

UNITED STATES PATENT AND TRADEMARK OFFICE
CERTIFICATE OF CORRECTION

PATENT NO. : 10,187,213 B2
APPLICATION NO. : 14/535558
DATED : January 22, 2019
INVENTOR(S) : Harjula et al.

It is certified that error appears in the above-identified patent and that said Letters Patent is hereby corrected as shown below:

On the Title Page

Column 2, item (56), under "Other Publications", Line 1, delete "SSH.com"SSH" and insert --SSH.com "SSH-- therefor Page 2, Column 1, item (56), under "Other Publications", Line 8, delete "Apglication" and insert --Application-- therefor In the Specification Column 6, Line 26, delete "key store 210" and insert --keystore 210-- therefor Column 6, Line 27, delete "key store 210." and insert --keystore 210.-- therefor Column 7, Line 64, delete "316," and insert --314,-- therefor Column 14, Line 8, delete "806," and insert --809,-- therefor Column 14, Line 16, delete "828" and insert --818-- therefor In the Claims Column 15, Line 54, Claim 1, delete "identify" and insert --identity-- therefor Column 17, Line 47, Claim 11, delete "verily" and insert --verify-- therefor Signed and Sealed this
Twenty-eighth Day of April, 2020

Andrei Iancu
*Director of the United States Patent and Trademark Office*